(12) United States Patent
Zhang et al.

(10) Patent No.: US 11,655,620 B2
(45) Date of Patent: May 23, 2023

(54) MULTI-CONTROL AUTOMATIC FAUCET

(71) Applicant: Xiamen Forbetter Sanitary Ware Co., Ltd., Fujian (CN)

(72) Inventors: Xingui Zhang, Xiamen (CN); Yihui Chen, Xiamen (CN); Mouyong Lin, Xiamen (CN); Yindong Mao, Xiamen (CN)

(73) Assignee: XIAMEN FORBETTER SANITARY WARE CO., LTD., Fujian (CN)

( * ) Notice: Subject to any disclaimer, the term of this patent is extended or adjusted under 35 U.S.C. 154(b) by 0 days.

(21) Appl. No.: 17/463,570

(22) Filed: Sep. 1, 2021

(65) Prior Publication Data
US 2022/0064920 A1 Mar. 3, 2022

(30) Foreign Application Priority Data

Sep. 2, 2020 (CN) .......................... 202010911300.0

(51) Int. Cl.
| | |
|---|---|
| *E03C 1/05* | (2006.01) |
| *F16K 11/22* | (2006.01) |
| *F16K 11/00* | (2006.01) |
| *F16K 31/06* | (2006.01) |
| *G01F 1/075* | (2006.01) |
| *E03C 1/02* | (2006.01) |

(52) U.S. Cl.
CPC .............. *E03C 1/055* (2013.01); *F16K 11/22* (2013.01); *F16K 19/006* (2013.01); *F16K 31/06* (2013.01); *G01F 1/075* (2013.01); *E03C 2001/026* (2013.01)

(58) Field of Classification Search
CPC ......... E03C 1/055; E03C 1/057; F16K 19/006
See application file for complete search history.

(56) References Cited

U.S. PATENT DOCUMENTS

| | | | | |
|---|---|---|---|---|
| 5,167,255 | A * | 12/1992 | Gohring | E03C 1/057 137/607 |
| 5,309,940 | A * | 5/1994 | Delabie | E03C 1/057 137/607 |
| 8,833,670 | B2 * | 9/2014 | Chen | G05D 23/1393 236/12.12 |
| 10,036,150 | B2 * | 7/2018 | Yan | F16K 31/52408 |
| 2008/0072969 | A1 * | 3/2008 | Maercovich | E03C 1/055 137/455 |
| 2012/0248351 | A1 * | 10/2012 | Huang | F16K 27/045 251/129.01 |
| 2017/0342691 | A1 * | 11/2017 | Yan | F16K 47/023 |

* cited by examiner

*Primary Examiner* — Reinaldo Sanchez-Medina
(74) *Attorney, Agent, or Firm* — Leong C. Lei

(57) ABSTRACT

A multi-control automatic faucet includes a faucet body, a manual valve core, a solenoid valve core, a water flow sensor, a main sensor switch, and a controller. The water flow sensor is configured to detect whether water flows through manual valve core. When there is water flowing through the manual valve core, the controller controls the main sensor switch to be inactive. When there is no water flowing through the manual valve core, the controller controls the faucet body to spray water out through the solenoid valve core. The multi-control automatic faucet has two control modes, namely, a manual control mode and a sensor control mode. It is convenient for users to use.

5 Claims, 15 Drawing Sheets

MULTI-CONTROL AUTOMATIC FAUCET

BACKGROUND OF THE INVENTION

1. Field of the Invention

The present invention relates to a faucet, and more particularly to a multi-control automatic faucet.

2. Description of the Prior Art

A conventional normal faucet is generally manually controlled. The user manually operates a manual valve core for the faucet to spray water out. With the development of society, an automatic faucet is developed on the market. Because the automatic faucet adopts a sensor control mode (non-contact control mode) for controlling the faucet to spray water out, it is convenient and practical, and is simple to operate. However, the conventional automatic faucets are connected in series for water supply. When the sensor switch fails or the power supply device is cut off, the automatic faucet will malfunction. It has shortcomings in use. In addition, the conventional automatic faucet generally closes its valve again after a few seconds, which cannot allow water to flow continuously. It has limitations in use.

SUMMARY OF THE INVENTION

The primary object of the present invention is to provide a multi-control automatic faucet having two control modes, namely, a manual control mode and a sensor control mode, which is convenient for users to use.

In order to achieve the above object, the present invention adopts the following solutions.

A multi-control automatic faucet comprises a faucet body, a manual valve core, a solenoid valve core, a water flow sensor, a main sensor switch, and a controller. The faucet body includes a main outlet water channel and a water control seat therein. The water control seat has a first outlet water channel and a second outlet water channel to communicate with the main outlet water channel. The manual valve core is installed to the faucet body. The manual valve core has an outlet communicating with the first outlet water channel. The solenoid valve core is installed in the faucet body. The solenoid valve core is configured to open and close the second outlet water channel. The water flow sensor is installed in the faucet body. The water flow sensor is configured to detect whether water flows through the first outlet water channel. The main sensor switch is installed to the faucet body. The main sensor switch is configured to sense a manual operation to control an action of the solenoid valve core. The controller is electrically connected to the solenoid valve core, the water flow sensor and the main sensor switch. When the water flow sensor detects that there is no water flowing through the first outlet water channel, the controller controls the solenoid valve core to open the second outlet water channel according to a signal of the main sensor switch. When the water flow sensor detects that there is water flowing through the first outlet water channel, the controller controls the main sensor switch to be inactive and the solenoid valve core to close the second outlet water channel.

Preferably, the manual valve core is a single-handle dual-control mixed water valve core. The single-handle dual-control mixed water valve core is located at an upper end of the water control seat. The water control seat includes a first inlet water channel and a second inlet water channel each having upper and lower openings. The single-handle dual-control mixed water valve core has a first inlet and a second inlet to communicate with the upper openings of the first inlet water channel and the second inlet water channel, respectively. The water control seat further has a mixed water outlet communicating with the first outlet water channel. The mixed water outlet has an opening facing upwards. The outlet of the single-handle dual-control mixed water valve core is in communication with the mixed water outlet.

Preferably, the second outlet water channel of the water control seat includes a water chamber and a sensor controlled water channel. The water chamber communicates with the sensor controlled water channel through a water-passing opening. A valve head of the solenoid valve core is inserted into the water chamber and movably blocks the water-passing opening.

Preferably, the solenoid valve core is disposed at a lower end of the water control seat. A bottom of the water chamber is provided with a mounting opening. The valve head of the solenoid valve core extends into the water chamber from the mounting opening.

Preferably, the water control seat includes a connecting seat and a valve seat connected to the connecting seat.

Preferably, the water control seat further has a first inlet water passage communicating with the water chamber and the first inlet water channel and a second inlet water passage communicating with the water chamber and the second inlet water channel.

Preferably, a side wall of the water control seat is formed with a first mounting hole. The first inlet water passage is in communication with the first inlet water channel through the first mounting hole. A first blocking member is rotatably fitted in the first mounting hole. An inner end of the first blocking member is provided with a flow regulating portion. The flow regulating portion is configured to control water flow passing through the first mounting hole along with rotation of the first blocking member. The faucet body has an operating hole corresponding to the first mounting hole.

Alternatively, a side wall of the water control seat is formed with a first mounting hole and a second mounting hole. The first inlet water passage is in communication with the first inlet water channel through the first mounting hole. An opening at an outer end of the first mounting hole is closed by a first blocking member. An inner side wall of the first mounting hole is formed with a first water hole communicating with the first inlet water channel. An inner end face of the first mounting hole is formed with a first orifice communicating with the first inlet water passage. A first inlet check valve is provided in the first orifice. The second inlet water passage is in communication with the second inlet water channel through the second mounting hole. An opening at an outer end of the second mounting hole is closed by a second blocking member. An inner side wall of the second mounting hole is formed with a second water hole communicating with the second inlet water channel. An inner end face of the second mounting hole is formed with a second orifice communicating with the second inlet water passage. A second inlet check valve is provided in the second orifice.

Preferably, the first inlet water channel and the second inlet water channel are provided with a first filter and a second filter, respectively. The first filter covers a junction of the first inlet water channel and the first inlet water passage. The second filter covers a junction of the second inlet water channel and the second inlet water passage.

Preferably, the water control seat has a buffer hole communicating with the water chamber, and an elastic buffer assembly is provided in the buffer hole.

Preferably, an outlet check valve is provided in the sensor controlled water channel.

Preferably, the water control seat further has an inlet water passage. The inlet water passage communicates with the water chamber and the first inlet water channel, or the inlet water passage communicates with the water chamber and the second inlet water channel.

Preferably, the faucet body includes a hollow main body and a spout disposed on one side of the main body. The manual valve core, the water control seat and the solenoid valve core are sequentially arranged in the main body in an upper-to-lower direction. The main outlet water channel is arranged in the spout.

Preferably, a main outlet pipe is disposed in the spout. An inner cavity of the main outlet pipe forms the main outlet water channel. The water control seat is provided with a connecting joint communicating with the first outlet water channel and the second outlet water channel One end of the main outlet pipe is connected to the connecting joint.

Alternatively, an inner cavity of the spout forms the main outlet water channel. An upper sealing ring and a lower sealing ring are fitted between an outer wall of the water control seat and an inner wall of the main body. An annular water chamber is formed among the water control seat, the main body, the upper sealing ring and the lower sealing ring. The main outlet water channel communicates with the first outlet water channel and the second outlet water channel through the annular water chamber.

Preferably, the water control seat has a water-passing orifice passing through two sides of the water control seat. An inner wall of the water-passing orifice is formed with a mixed water outlet and a sensor controlled outlet to communicate with the outlet of the manual valve core and an outlet end of the second outlet water channel, respectively. An opening at one end of the water-passing orifice communicates with the main outlet water channel. An opening at another end of the water-passing orifice is closed by a water control seat plug. The water control seat plug has a plug channel therein. A side wall of the water control seat plug is formed with a perforation communicating with the plug channel and the mixed water outlet. A water-passing pipe connected to the water control seat plug is fitted in the water-passing orifice. The first outlet water channel is formed in the water-passing pipe. An inlet end of the first inlet water channel communicates with the plug channel. An outlet end of the first outlet water channel communicates with the main outlet water channel. The water-passing channel is formed between an outer wall of the water-passing pipe and the inner wall of the water-passing orifice. The water-passing channel communicates with the sensor controlled outlet and the main outlet water channel.

Preferably, the water flow sensor includes a rotatable magnetic impeller located in the first outlet water channel and a Hall element located outside the first outlet water channel. The Hall element is electrically connected to the controller.

Preferably, the multi-control automatic faucet further comprises an auxiliary sensor switch installed on the faucet body. The auxiliary sensor switch is electrically connected to the controller.

Preferably, the multi-control automatic faucet further comprises a power supply battery electrically connected to the controller. The power supply battery is installed to a battery holder. The battery holder includes an elastic clamp.

Preferably, the battery holder has a slot.

When water flows through the outlet of the manual valve core, the water flow sensor will detect there is water flowing through the first outlet water channel and send a signal to the controller. Then, the controller controls the main sensor switch to be inactive and the solenoid valve core to close the second outlet water channel, so that the multi-control automatic faucet is completely in the manual control mode. At this time, the user can manually operate the manual valve core for water to flow out from the main outlet water channel continuously. This is convenient for the user to use. When there is no water flowing through the outlet of the manual valve core, the water flow sensor will detect there is no water flowing through the first outlet water channel, and the controller will receive the signal of the main sensor switch and control the solenoid valve core according to the signal of the main sensor switch, and the solenoid valve core will open the second outlet water channel according to the signal of the main sensor switch. At this time, the multi-control automatic faucet is in a sensor control mode. By sensing the manual operation, the main sensor switch controls whether water flows through the second outlet water channel to the main outlet water channel to spray water out.

It can be seen from the above that the multi-control automatic faucet of the present invention has two control modes, namely, a manual control mode and a sensor control mode. It is convenient for users to use. Moreover, the priority of the manual control mode of the present invention is higher than that of the sensor control mode. In this way, when the power is cut off or the main sensor switch is abnormal, the user can operate the manual valve core to control water to flow out from the main outlet water channel, so as to satisfy the user's demand for water.

DETAILED DESCRIPTION OF THE PREFERRED EMBODIMENTS

Figure 1:
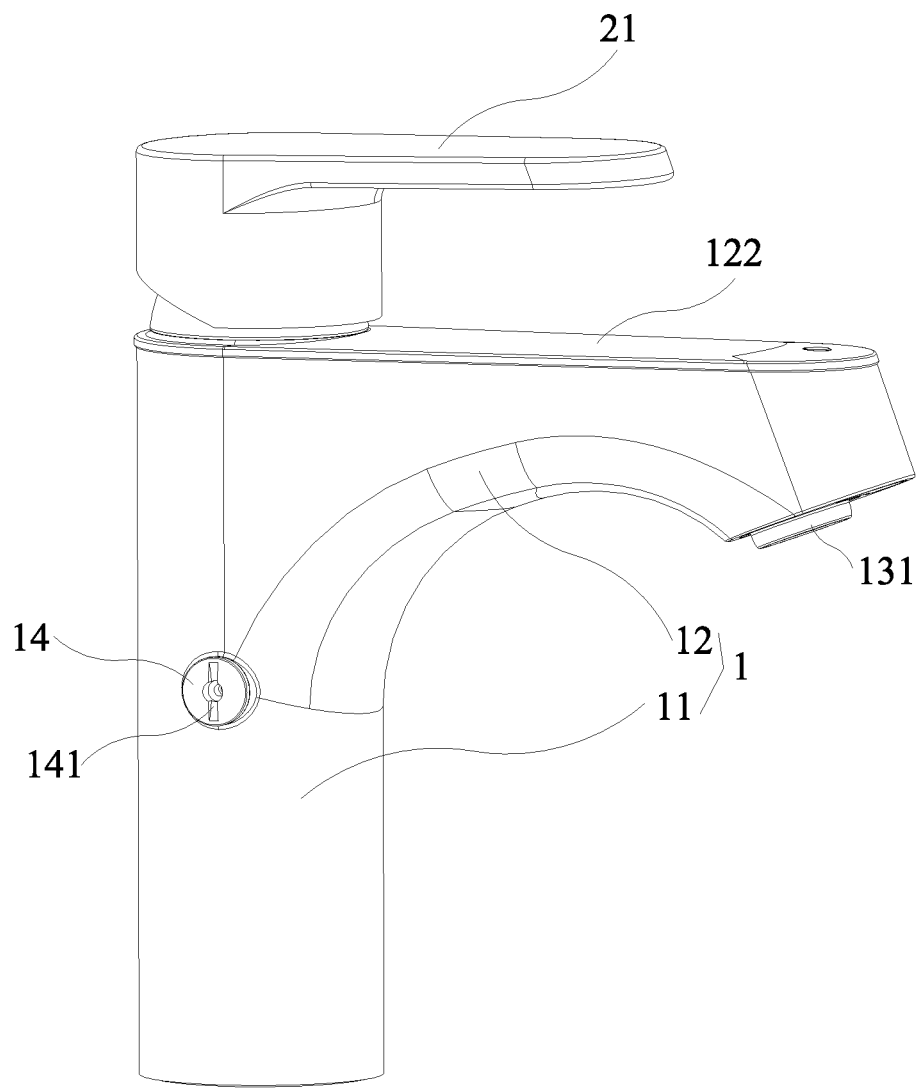
FIG. 1 is a first perspective view according to a first embodiment of the present invention.
Figure 2:
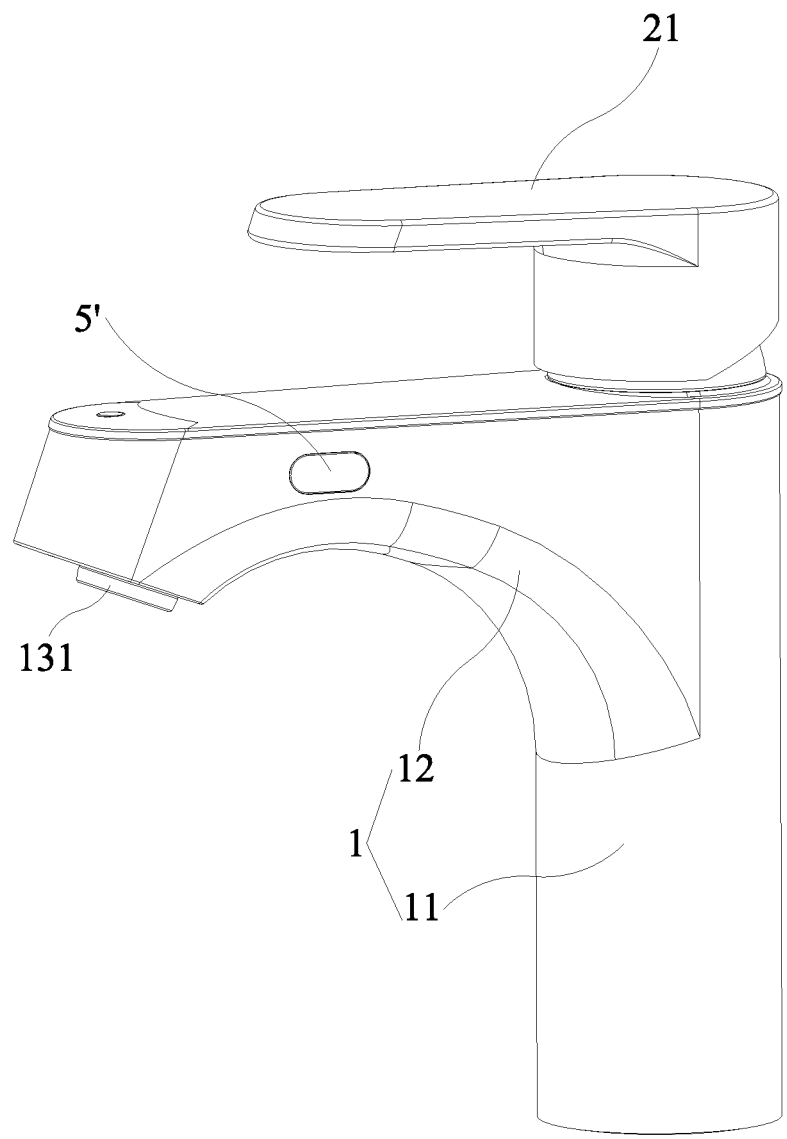
FIG. 2 is a second perspective view according to the first embodiment of the present invention.
Figure 3:
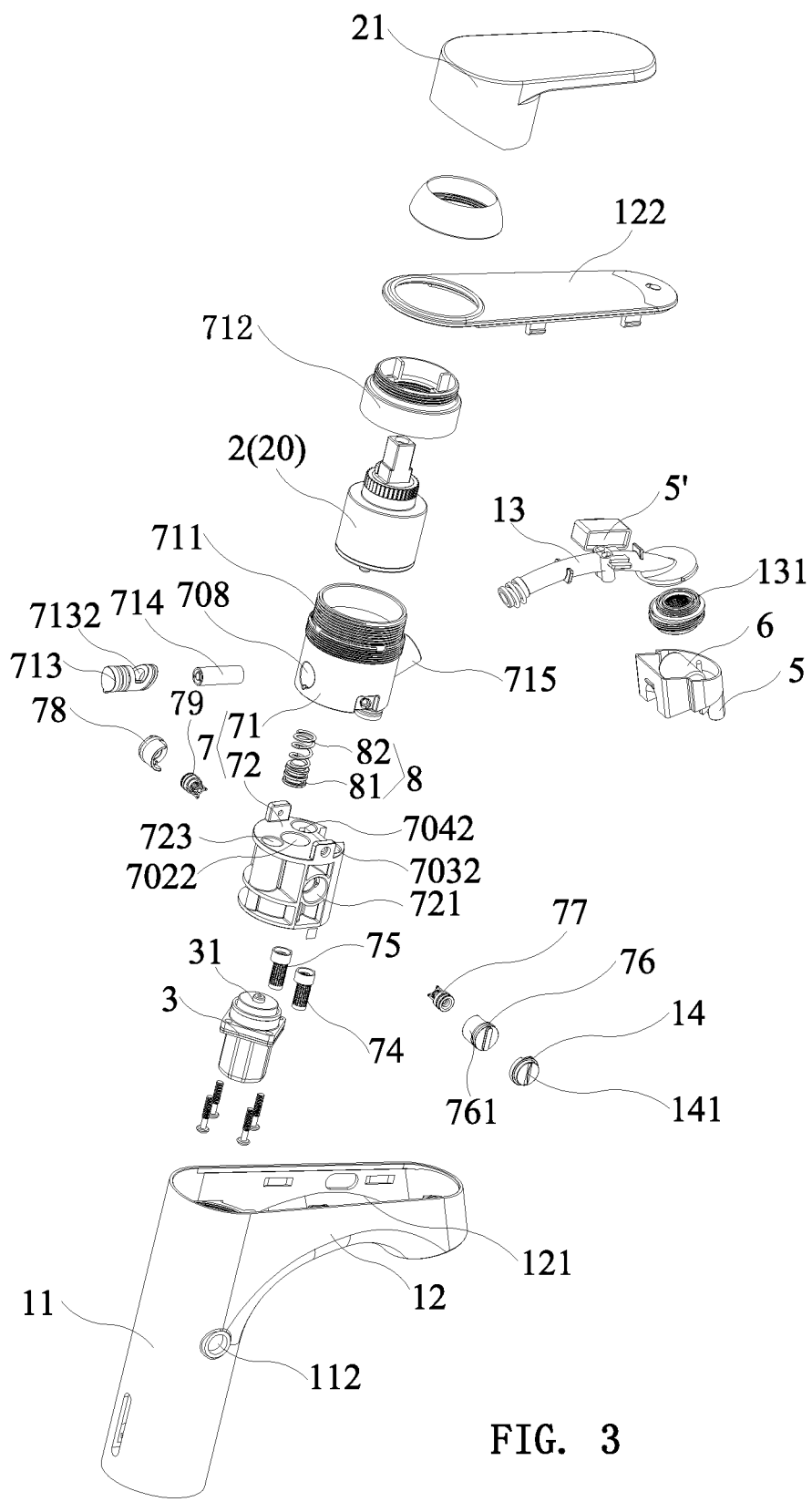
FIG. 3 is a first exploded view according to the first embodiment of the present invention.
Figure 4:
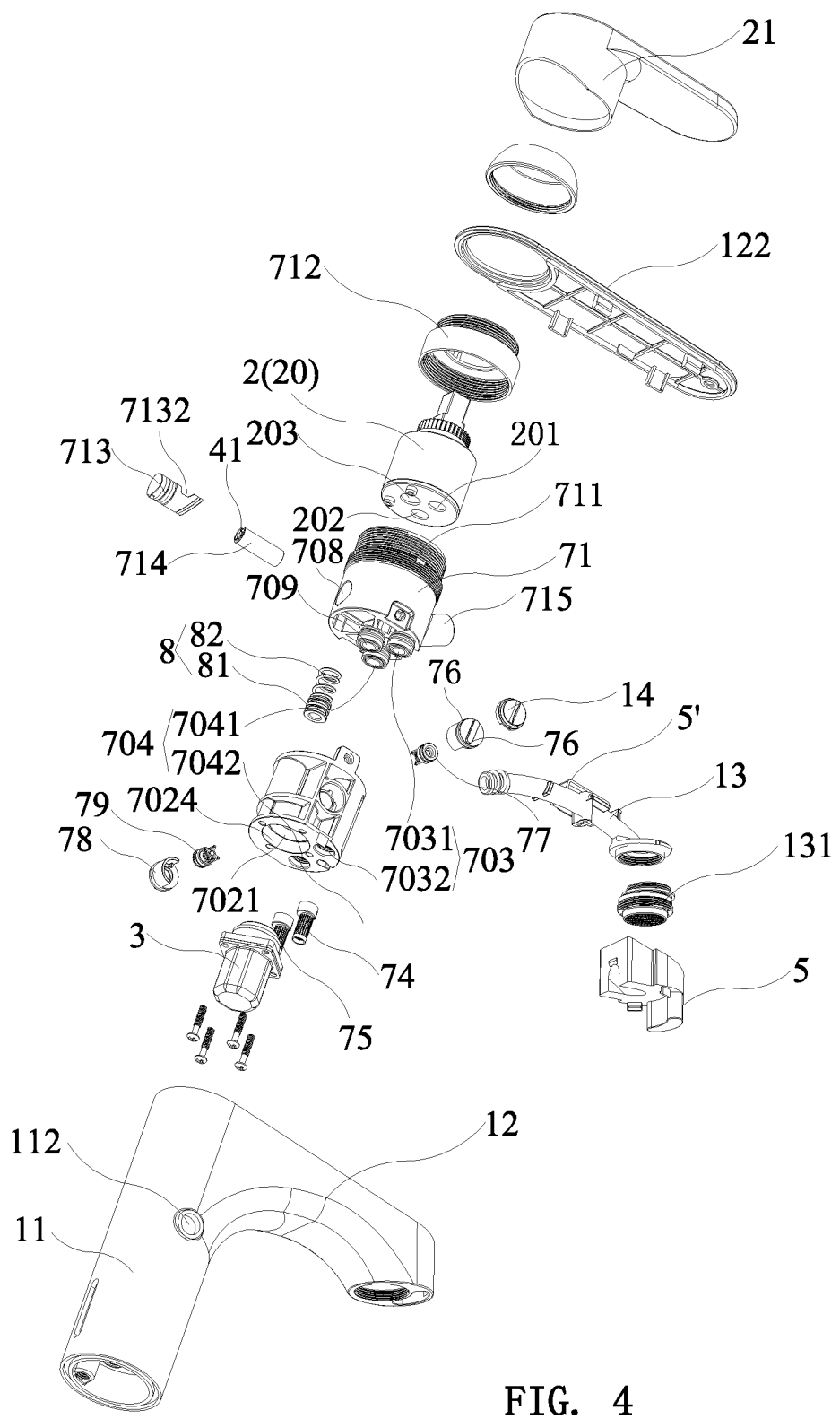
FIG. 4 is a second exploded view according to the first embodiment of the present invention.
Figure 5:
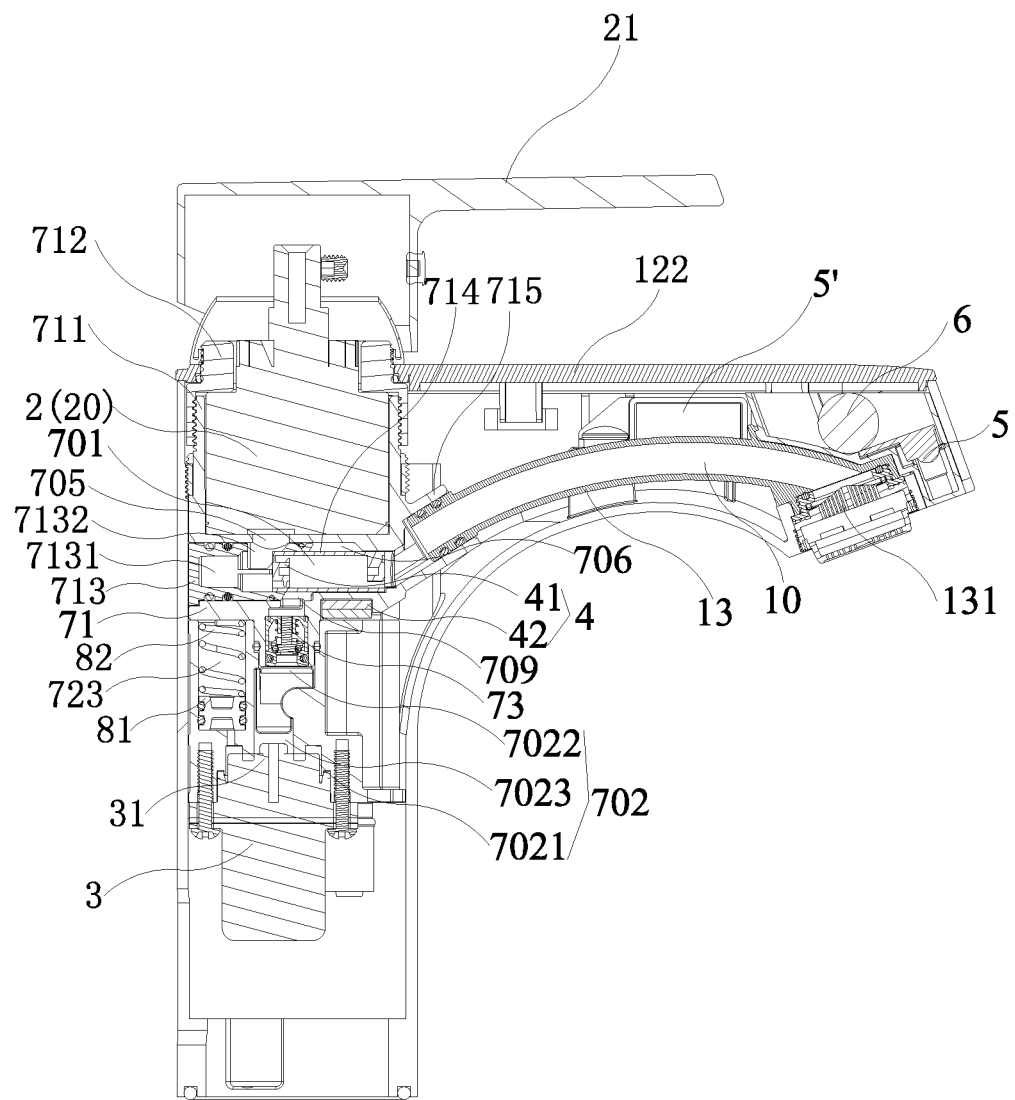
FIG. 5 is a first sectional view according to the first embodiment of the present invention.
Figure 6:
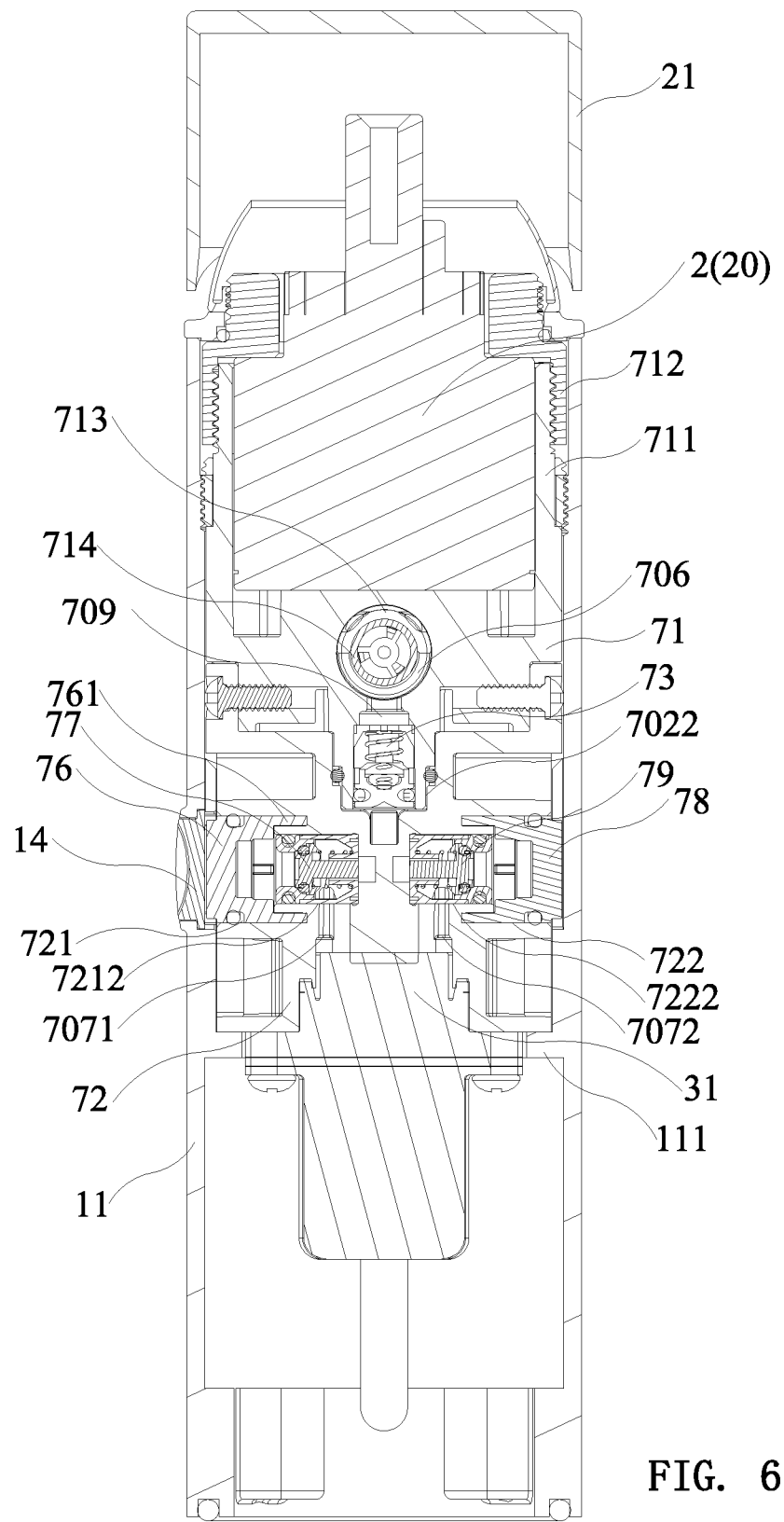
FIG. 6 is a second sectional view according to the first embodiment of the present invention.
Figure 7:
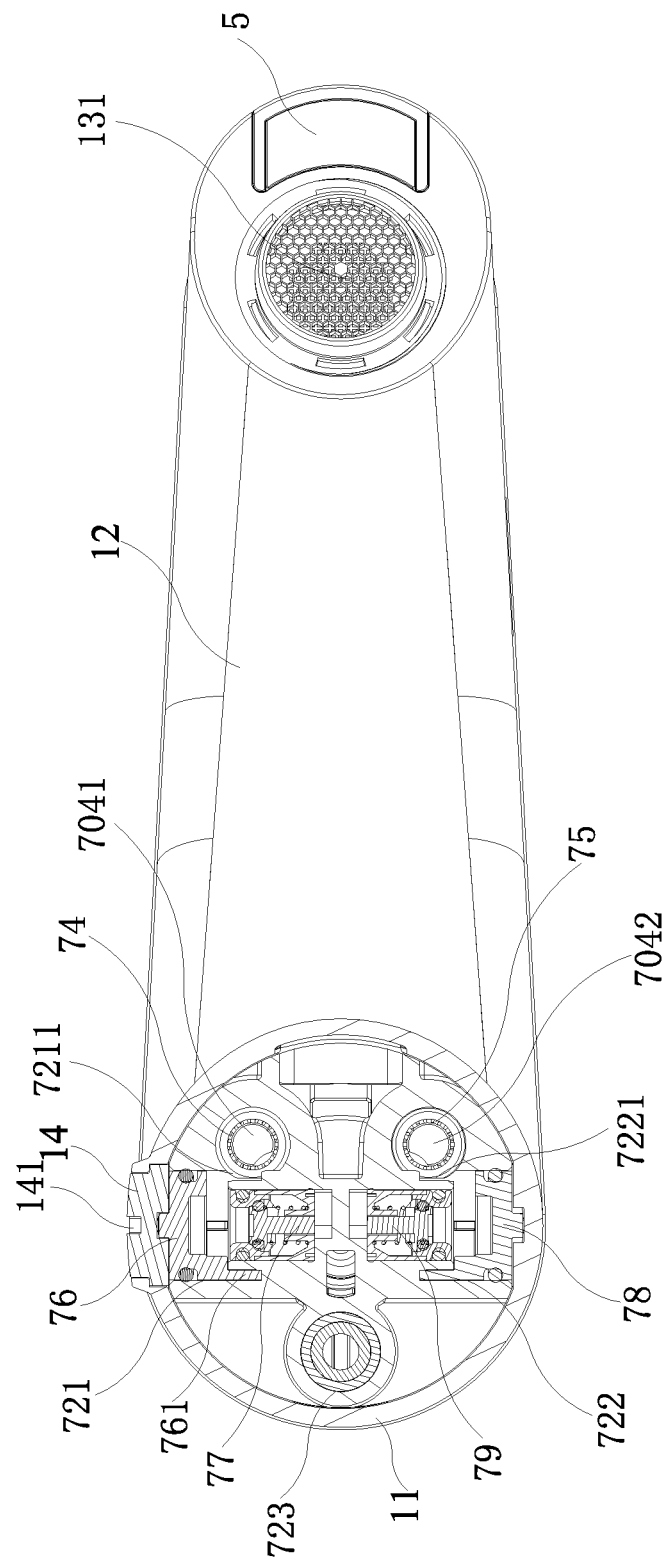
FIG. 7 is a third sectional view according to the first embodiment of the present invention.
Figure 8:
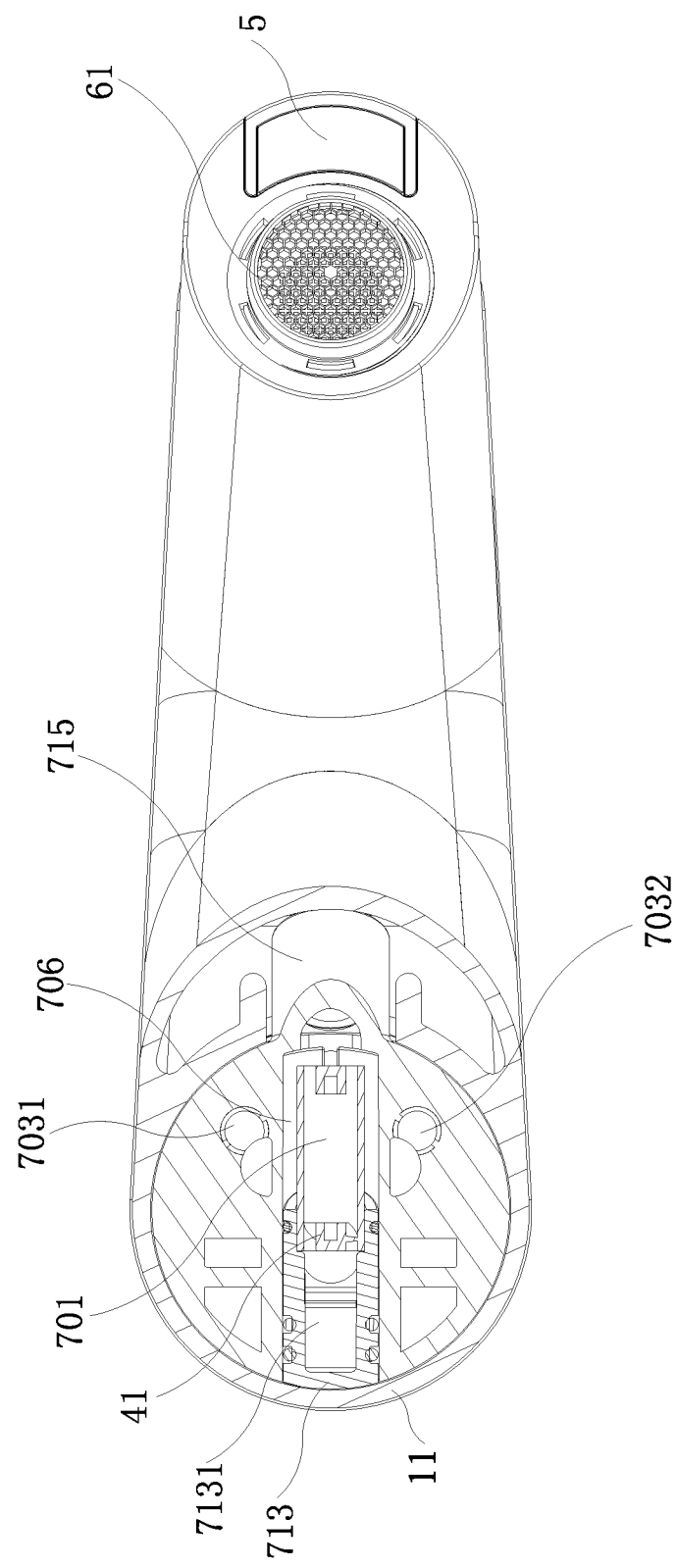
FIG. 8 is a fourth sectional view according to the first embodiment of the present invention.
Figure 9:
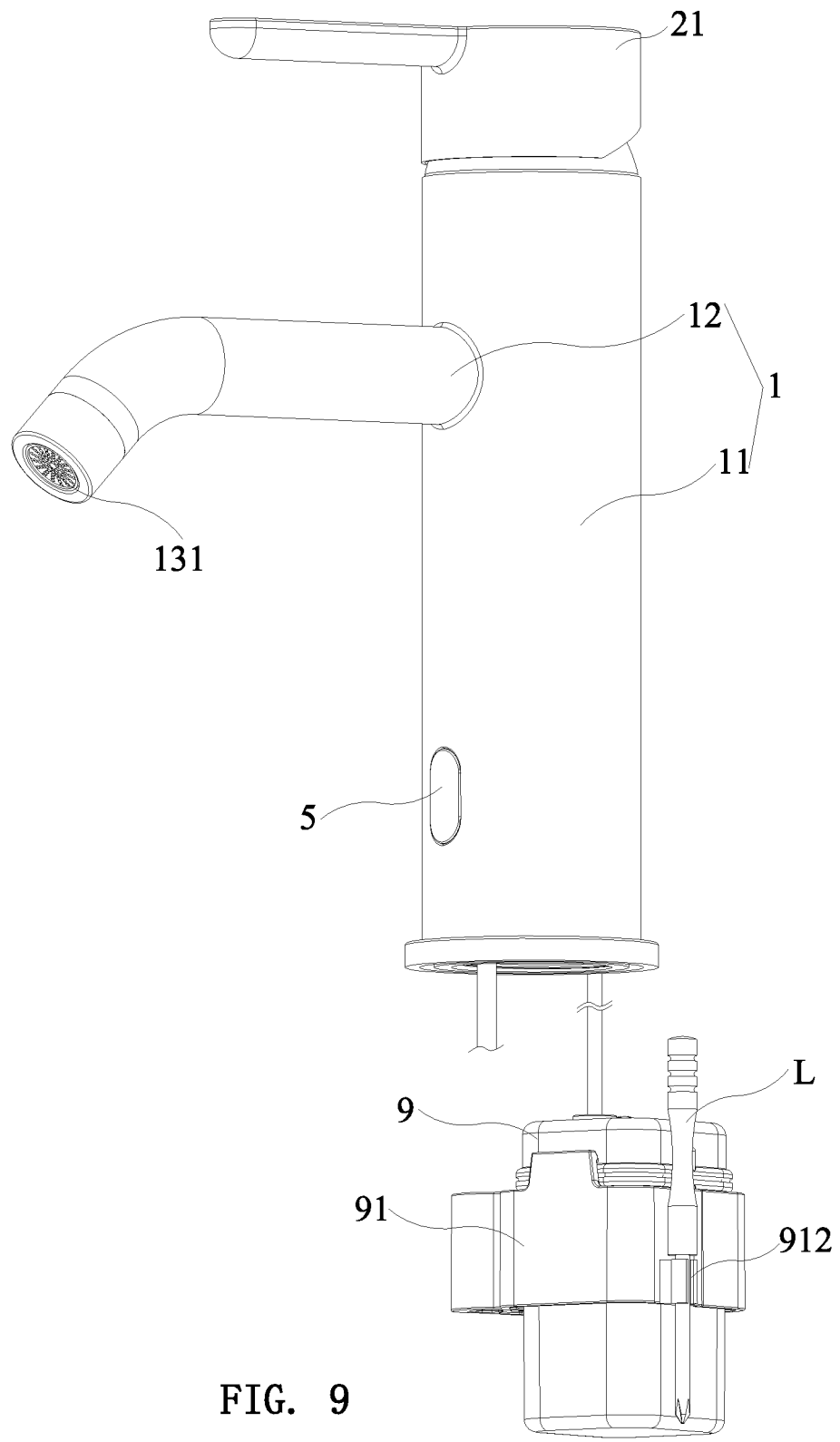
FIG. 9 is a first perspective view according to a second embodiment of the present invention.
Figure 10:
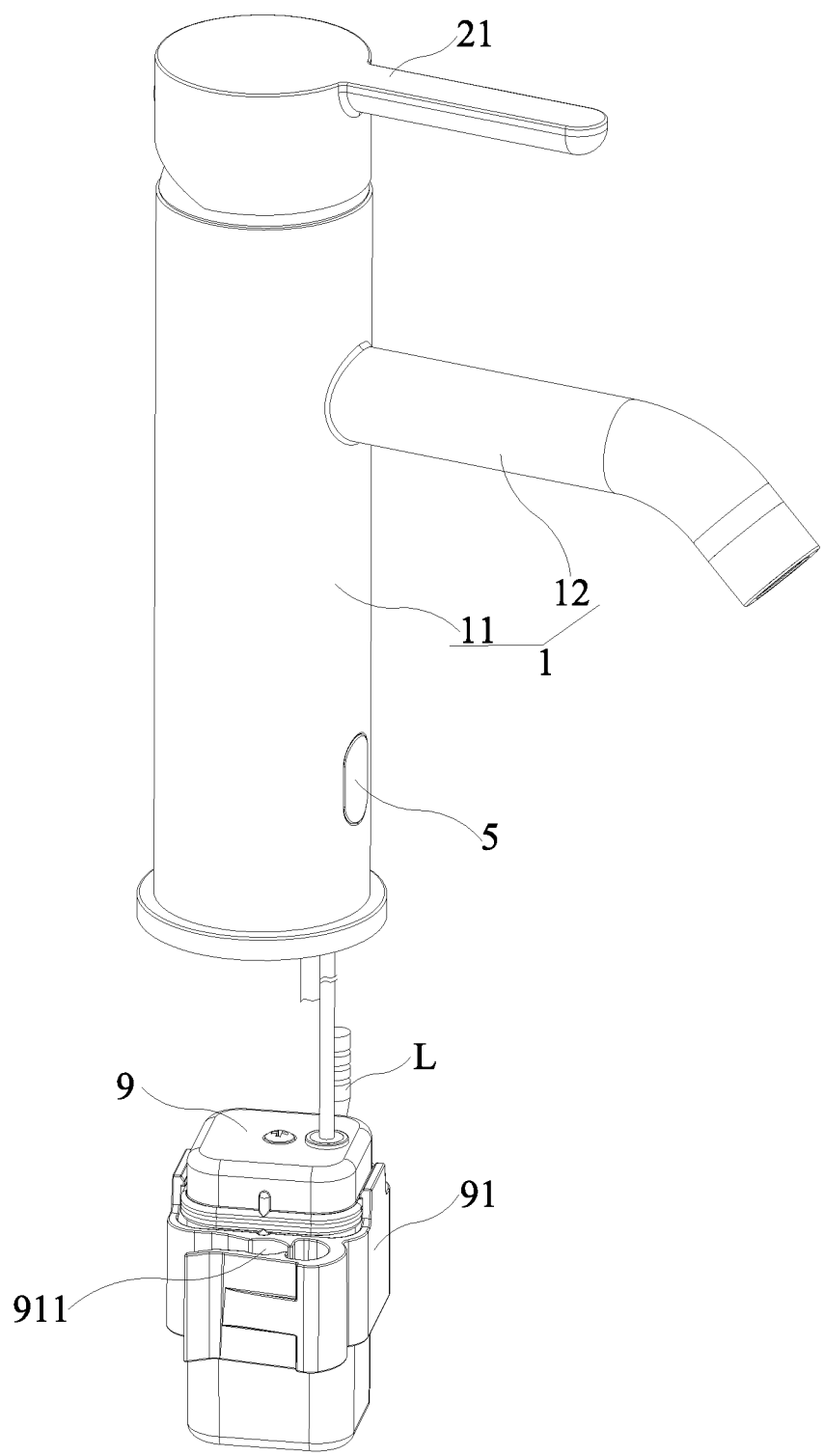
FIG. 10 is a second perspective view according to the second embodiment of the present invention.
Figure 11:
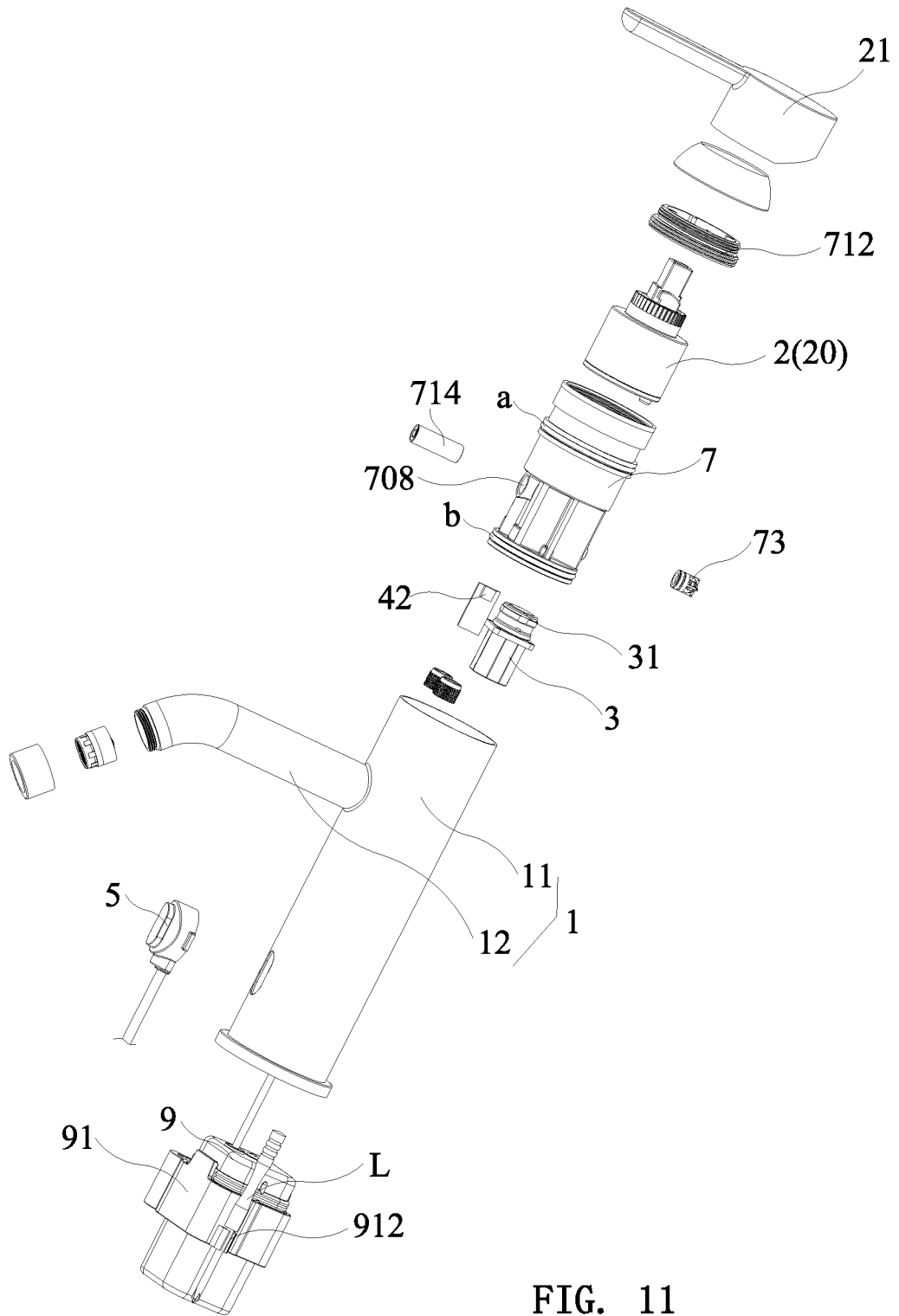
FIG. 11 is a first exploded view according to the second embodiment of the present invention.
Figure 12:
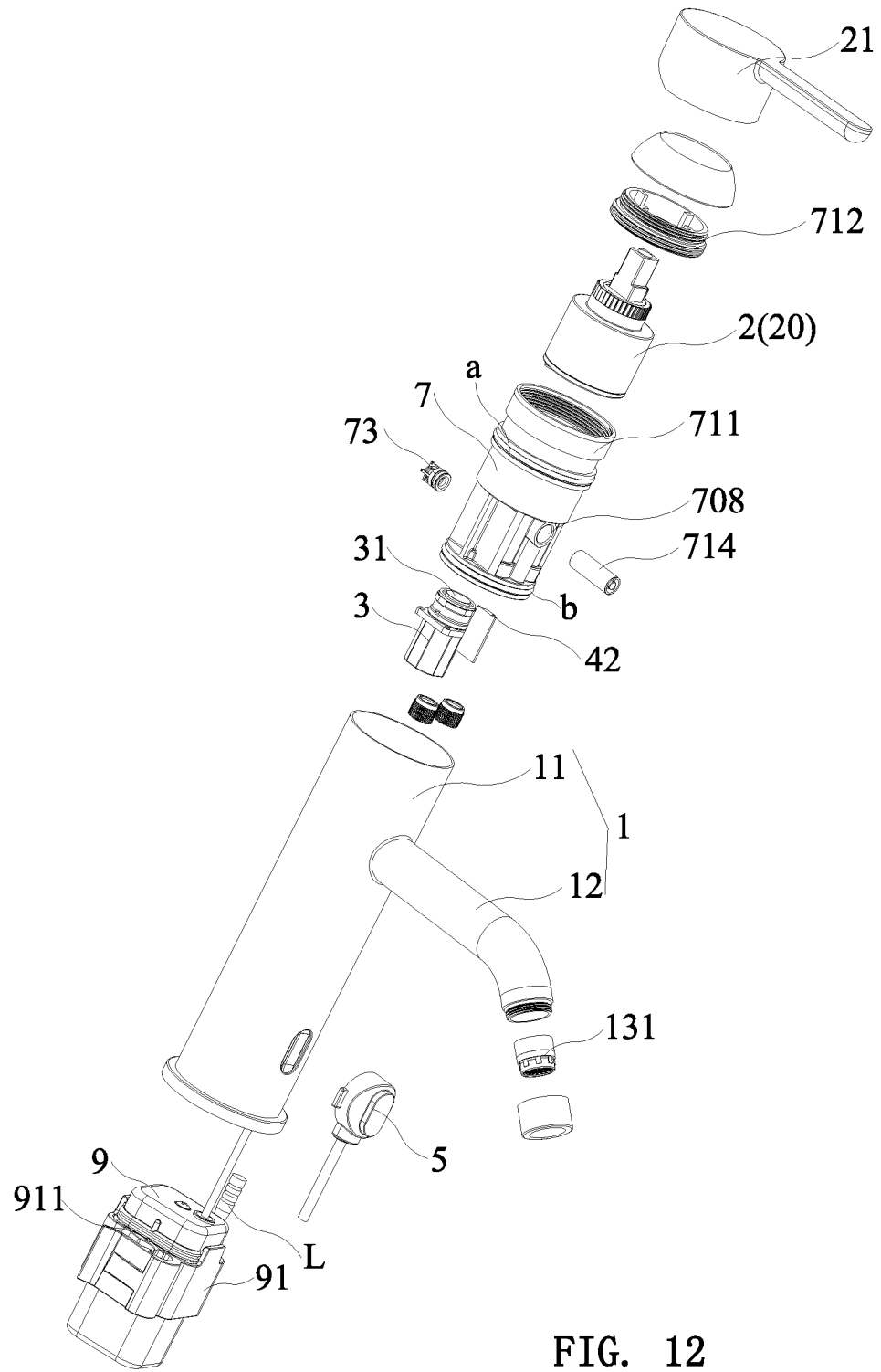
FIG. 12 is a second exploded view according to the second embodiment of the present invention.
Figure 13:
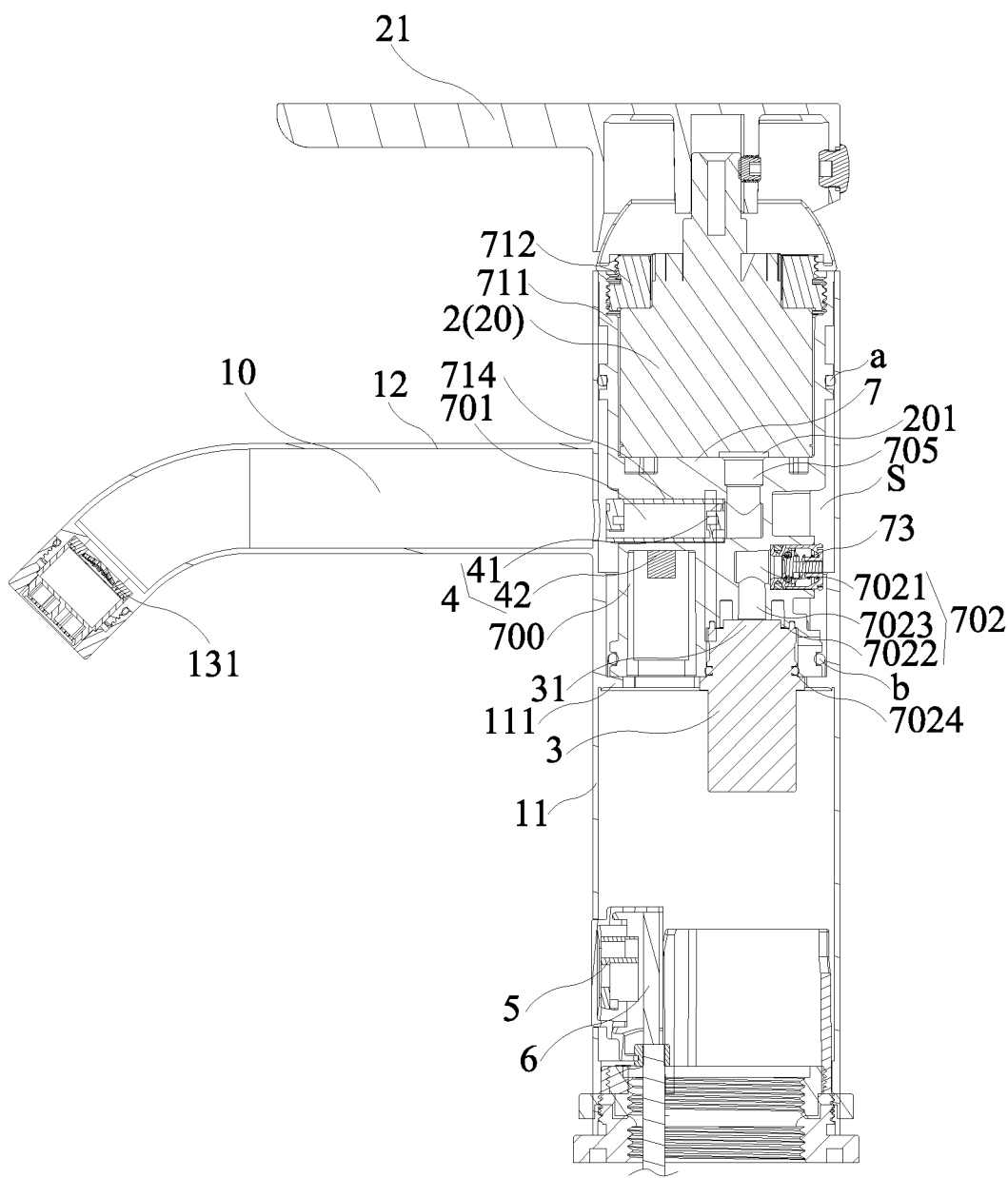
FIG. 13 is a first sectional view according to the second embodiment of the present invention.
Figure 14:
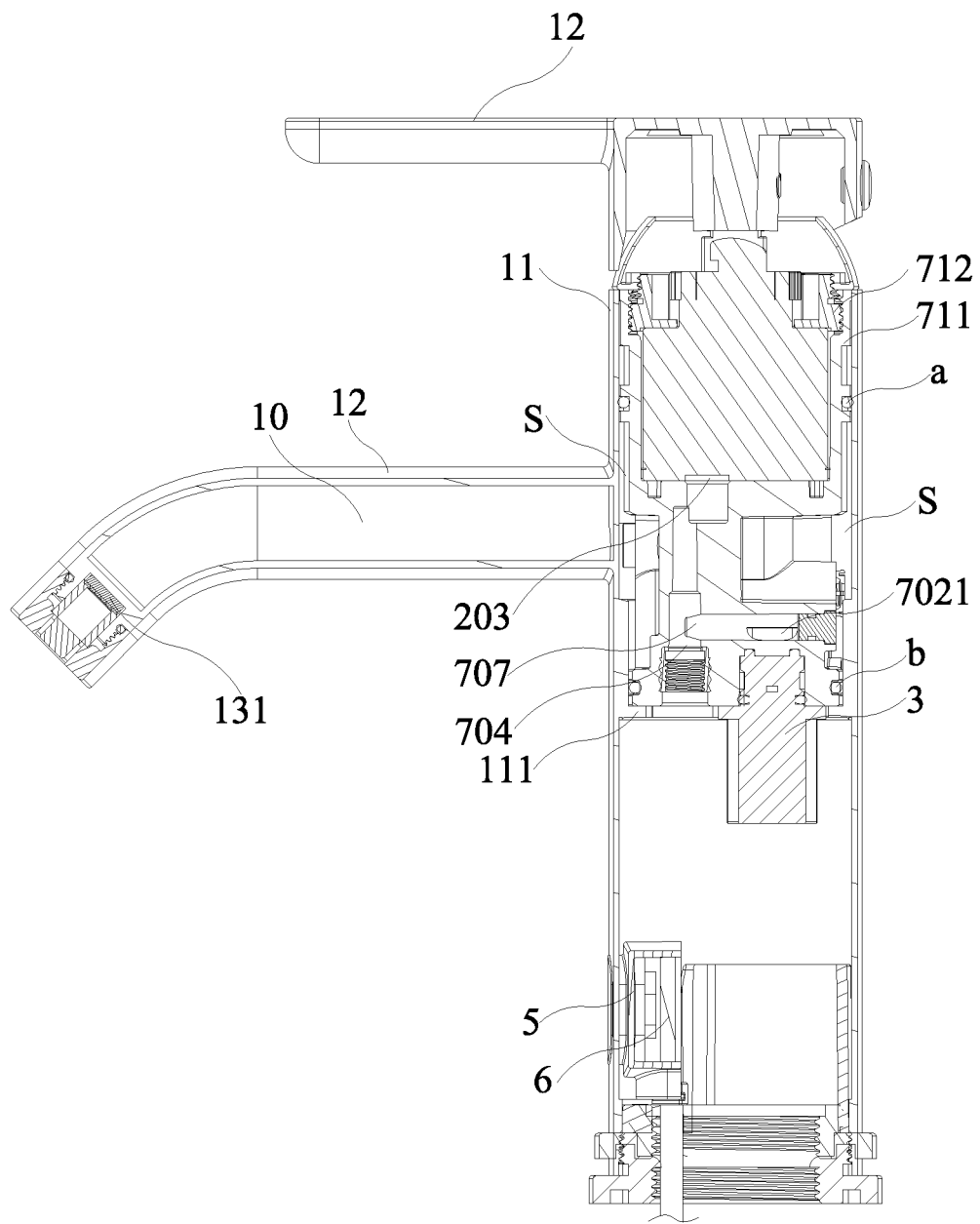
FIG. 14 is a second sectional view according to the second embodiment of the present invention.
Figure 15:
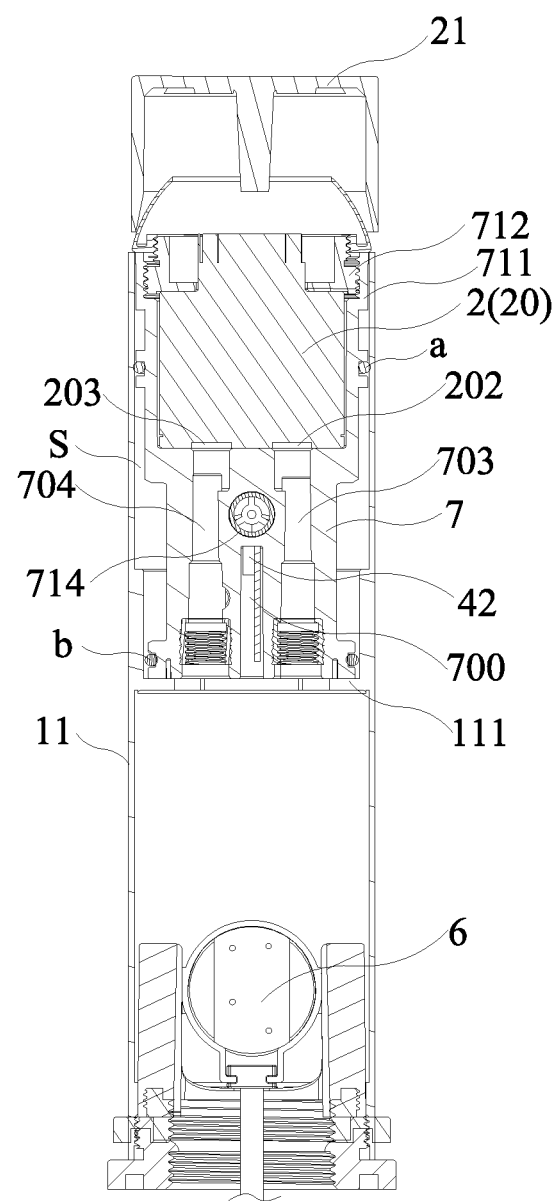
FIG. 15 is a third sectional view according to the second embodiment of the present invention.

Referring to FIG. 1 through FIG. 15, the present invention discloses a multi-control automatic faucet, comprising a faucet body 1, a manual valve core 2, a solenoid valve core 3, a water flow sensor 4, a main sensor switch 5, and a controller 6. The faucet body 1 includes a main outlet water channel 10 and a water control seat 7 therein. The water control seat 7 has a first outlet water channel 701 and a second outlet water channel 702 to communicate with the main outlet water channel 10. The manual valve core 2 is installed to the faucet body 1. The manual valve core 2 has an outlet 201 communicating with the first outlet water channel 701. The solenoid valve core 3 is installed in the faucet body 1. The solenoid valve core 3 is configured to open and close the second outlet water channel 702. The water flow sensor 4 is installed in the faucet body 1. The water flow sensor 4 is configured to detect whether water flows through the first outlet water channel 701. The water flow sensor 4 detects whether water flows through the manual valve core 2 by detecting whether water flows through the first outlet water channel 701. The main sensor switch 5 is installed to the faucet body 1. The main sensor switch 5 is configured to sense a manual operation to control the action of the solenoid valve core 3. The controller 6 is electrically connected to the solenoid valve core 3, the water flow sensor 4 and the main sensor switch 5. When the water flow sensor 4 detects that there is no water flowing through the first outlet water channel 701, the controller 6 controls the solenoid valve core 3 to open the second outlet water channel 702 according to a signal of the main sensor switch 5. When the water flow sensor 4 detects that there is water flowing through the first outlet water channel 701, the controller 6 controls the main sensor switch 5 to be inactive and the solenoid valve core 3 to close the second outlet water channel 702.

When the multi-control automatic faucet of the present invention is in use, the user manually operates the manual valve core 2 to control water to flow through the outlet 201 of the manual valve core 2 and then to flow through the main outlet water channel 10 to spray water out, so that the present invention realizes a manual control mode. In the present invention, when water flows through the outlet 201 of the manual valve core 2, the water flow sensor 4 will detect there is water flowing through the first outlet water channel 701 and send a signal to the controller 6. Then, the controller 6 controls the main sensor switch 5 to be inactive and the solenoid valve core 3 to close the second outlet water channel 702, so that the multi-control automatic faucet is completely in the manual control mode. At this time, the user can manually operate the manual valve core 2 for water to flow out from the main outlet water channel 10 continuously. This is convenient for the user to use. When there is no water flowing through the outlet 201 of the manual valve core 2, the water flow sensor 4 will detect there is no water flowing through the first outlet water channel 701, and the controller 6 will receive the signal of the main sensor switch 5 and control the solenoid valve core 3 according to the signal of the main sensor switch 5, and the solenoid valve core 3 will open the second outlet water channel 702 according to the signal of the main sensor switch 5. At this time, the multi-control automatic faucet is in a sensor control mode. By sensing the manual operation, the main sensor switch 5 controls whether water flows through the second outlet water channel 702 to the main outlet water channel 10 to spray water out.

It can be seen from the above that the multi-control automatic faucet of the present invention has two control modes, namely, a manual control mode and a sensor control mode. It is convenient for users to use. Moreover, the priority of the manual control mode of the present invention is higher than that of the sensor control mode. In this way, when the power is cut off or the main sensor switch 5 is abnormal, the user can operate the manual valve core 2 to control water to flow out from the main outlet water channel 10, so as to satisfy the user's demand for water. In the sensor control mode of the present invention, the controller 6 controls the solenoid valve core 3 for water to flow through the second outlet water channel 702 within a preset time when the main sensor switch 5 senses the manual operation every time. In the sensor control mode of the present invention, when the main sensor switch 5 senses the manual operation, the controller 6 controls the solenoid valve core 3 for water to flow through the second outlet water channel 702, so as to spray water out instantly. In order to further explain the technical solutions of the present invention, the present invention will be described in detail below through specific embodiments.

First Embodiment

As shown in FIGS. 1 to 8, in the first embodiment of the present invention, the faucet body 1 may include a hollow main body 11 and a spout 12 disposed on one side of the main body 11. The manual valve core 2, the water control seat 7 and the solenoid valve core 3 are sequentially arranged in the main body 11 in an upper-to-lower direction, so that the manual valve core 2 and the solenoid valve core 3 are located on the upper and lower ends of the water control seat 7, respectively. This is beneficial to reduce the inner diameter of the faucet body 1. The main outlet water channel 10 is arranged in the spout 12. Specifically, a main outlet pipe 13 is disposed in the spout 12. The inner cavity of the main outlet pipe 13 forms the main outlet water channel 10. The top of the spout 12 has a mounting opening 121 for mounting the main outlet pipe 13. The mounting opening 121 is covered by a cover 122. The inner wall of the main body 11 has a retaining edge 111 to abut against the bottom of the water control seat 7 to prevent the water control seat 7 from falling. The solenoid valve core 3 is locked to the water control seat 7 through screws. The water control seat 7 includes a connecting seat 71 and a valve seat 72 that are connected to form the water channel in the water control seat 7. The connecting seat 71 and the valve seat 72 are connected by screws. The water control seat 7 may be provided with a sleeve 711 having an opening facing upward. The sleeve 711 is arranged on the connecting seat 71. The manual valve core 2 is inserted into the sleeve 711. The sleeve 711 is connected with a press cover 712 that presses the manual valve core 2 to prevent the manual valve core 2 from coining out.

In the first embodiment of the present invention, the manual valve core 2 may be a single-handle dual-control mixed water valve core 20. The single-handle dual-control mixed water valve core 20 can adjust water temperature and water flow. The lever of the single-handle dual-control mixed water valve core 20 is connected to a handle 21 for the user to operate. The water control seat 7 includes a first inlet water channel 703 and a second inlet water channel 704 each having upper and lower openings. The single-handle dual-control mixed water valve core 20 has a first inlet 202 and a second inlet 203 to communicate with the upper openings of the first inlet water channel 703 and the second inlet water channel 704, respectively. In this way, water flows into the single-handle dual-control mixed water valve core 20 from the first inlet water channel 703 and the second inlet water channel 704. Hot water and cold water are introduced into the first inlet water channel 703 and the second inlet water channel 704, respectively. The water control seat 7 further has a mixed water outlet 705 communicating with the first outlet water channel 701. The mixed water outlet 705 has an opening facing upwards. The outlet 201 of the single-handle dual-control mixed water valve core 20 is in communication with the mixed water outlet 705. In this way, the water flow of the single-handle dual-control mixed water valve core 20 is delivered to the first outlet water channel 701 through the mixed water outlet 705. The first inlet water channel 703 includes a first inlet upper water channel 7031 and a first inlet lower water channel 7032 that are disposed in the connecting seat 71 and the valve seat 72, respectively. The first inlet upper water channel 7031 and the first inlet lower water channel 7032 are butted to form the first inlet water channel 703. The second inlet water channel 704 includes a second inlet upper water channel 7041 and a second inlet lower water channel 7042 that are disposed in the connecting seat 71 and the valve seat 72, respectively. The first outer water channel 701 and the mixed water outlet 705 are disposed in the connecting seat 71.

In the first embodiment of the present invention, the second outlet water channel 702 of the water control seat 7 may be disposed in the valve seat 72 of the water control seat 7. The second outlet water channel 702 communicates with the main outlet water channel 10 through a water-passing channel 706 disposed in the connecting seat 71. The second outlet water channel 702 may include a water chamber 7021 and a sensor controlled water channel 7022. The water chamber 7021 communicates with the sensor controlled water channel 7022 through a water-passing opening 7023. The outlet end of the sensor controlled water channel 7022 is the outlet end of the second outlet water channel 702. The outlet end of the second outlet water channel 702 may be disposed on the top of the valve seat 72. A valve head 31 of the solenoid valve core 3 is inserted into the water chamber 7021 and movably blocks the water-passing opening 7023, thereby opening and closing the second outer water channel 702. The bottom of the water chamber 7021 may be provided with a mounting opening 7024. The valve head 31 of the solenoid valve core 3 extends into the water chamber 7021 from the mounting opening 7024. In this way, the solenoid valve core 3 is disposed at the lower end of the water control seat 7. The solenoid valve core 3 may be fixed to the bottom of the valve seat 72 of the water control seat 7 by screws, so that the solenoid valve core 3 is disposed at the lower end of the water control seat 7. The solenoid valve core 3 and the valve seat 72 are combined to form a solenoid valve. The outlet end of the sensor controlled water channel 7022 is the outlet of the solenoid valve. An outlet check valve 73 is provided in the sensor controlled water channel 7022. The outlet check valve 73 can prevent the water output from the first outer water channel 701 from flowing back to the water chamber 7021.

In the first embodiment of the present invention, the water control seat 7 further has a first inlet water passage 7071 communicating with the water chamber 7021 and the first inlet water channel 703 and a second inlet water passage 7072 communicating with the water chamber 7021 and the second inlet water channel 704. In this way, water is introduced into the water chamber 7021 from the first inlet water channel 703 and the second inlet water channel 704, so that the water chamber 7021 is input with cold water and hot water to form mixed water to be output. The first inlet water channel 703 and the second inlet water channel 704 are provided with a first filter 74 and a second filter 75, respectively. The first filter 74 covers the junction of the first inlet water channel 703 and the first inlet water passage 7071 to filter water flowing into the first inlet water passage 7071. The second filter 75 covers the junction of the second inlet water channel 704 and the second inlet water passage 7072 to filter water flowing into the second inlet water passage 7072.

In the first embodiment of the present invention, the side wall of the water control seat 7 is formed with a first mounting hole 721 and a second mounting hole 722. The first inlet water passage 7071 is in communication with the first inlet water channel 703 through the first mounting hole 721. The opening at the outer end of the first mounting hole 721 is closed by a first blocking member 76. The inner side wall of the first mounting hole 721 is formed with a first water hole 7211 communicating with the first inlet water channel 703. The first filter 74 covers the first water hole 7211. The inner end face of the first mounting hole 721 is formed with a first orifice 7212 communicating with the first inlet water passage 7071. A first inlet check valve 77 is provided in the first orifice 7212. The second inlet water passage 7072 is in communication with the second inlet water channel 704 through the second mounting hole 722. The opening at the outer end of the second mounting hole 722 is closed by a second blocking member 78. The inner side wall of the second mounting hole 722 is formed with a second water hole 7221 communicating with the second inlet water channel 704. The second filter 75 covers the second water hole 7221. The inner end face of the second mounting hole 722 is formed with a second orifice 7222 communicating with the second inlet water passage 7072. A second inlet check valve 79 is provided in the second orifice 7222. In the present invention, the first inlet check valve 77 and the second inlet check valve 79 can prevent the first inlet water channel 703 and the second inlet water channel 704 from communicating with each other. That is, the cold water in the second inlet water channel 704 is prevented from flowing through the water chamber 7021 into the first inlet water channel 703 to be mixed with the hot water in the first inlet water channel 703. The first inlet water passage 7071 and the second inlet water passage 7072 may be disposed in the valve seat 72 of the water control seat 7. The first mounting hole 721 and the second mounting hole 722 are also disposed in the valve seat 72 of the water control seat 7. The first inlet water passage 7071 communicates with the first inlet lower water channel 7032 of the first inlet water channel 703 through the first mounting hole 721. The second inlet water passage 7072 communicates with the second inlet lower water channel 7042 of the second inlet water channel 704 through the second mounting hole 722. The first inlet water passage 7071 is formed at the bottom of the inner side wall of the first orifice 7212. The second inlet water passage 7072 is formed at the bottom of the inner side wall of the second orifice 7222. In this way, the structure of the water control seat 7 is compact and the diameter is small.

In the first embodiment of the present invention, the first blocking member 76 may be rotatably fitted in the first mounting hole 721. The end of the first blocking member 76 is provided with a flow regulating portion 761. The flow regulating portion 761 is configured to control water flow passing through the first mounting hole 721 along with rotation of the first blocking member 76, thereby regulating water flow from the first inlet water channel 703 into the water chamber 7021 and regulating the temperature of water flowing out of the first outlet water channel 702. The flow regulating portion 761 is rotatable to control the water-passing area of the first water hole 7211 of the first mounting hole 721 to control water flow of the first mounting hole 721.

The main body 11 has an operating hole 112 corresponding to the first mounting hole 721 for the user to rotate the first blocking member 76. The first blocking member 76 is connected with an operating member 14. The operating member 14 is rotatably inserted in the operating hole 112. The outer end of the operating member 14 is formed with a groove 141, so that the user can rotate the operating member 14 through a coin, a key or a screwdriver inserted into the groove 141, and the operating member 14 drives the first blocking member 76 to rotate.

In the first embodiment of the present invention, the water control seat 7 has a buffer hole 723 communicating with the water chamber 7021. The buffer hole 723 is arranged in the upper-to-lower direction. An elastic buffer assembly 8 is provided in the buffer hole 723. In this way, when the valve head 31 of the solenoid valve core 3 closes the water-passing opening 7023 and there is no water flowing into the second outlet water channel 702, the elastic buffer assembly 8 provides a buffer function to effectively reduce the impact of the water control seat 7 and avoid the phenomenon of water hammer. The elastic buffer assembly 8 may include a buffer pad 81 and a buffer spring 82. The buffer hole 723 is disposed in the valve seat 72 of the water control seat 7. The buffer hole 723 is arranged in the upper-to-lower direction. The buffer pad 81 can be moved up and down in the buffer hole 723. The buffer pad 81 is movably, hermetically fitted in the buffer hole 723. The upper and lower ends of the buffer spring 82 abut against the connecting seat 71 of the water control seat 7 and the buffer pad 81, respectively. When the valve head 31 of the solenoid valve core 3 closes the water-passing opening 7023, the water flow in the water chamber 7021 will squeeze the buffer pad 81 to compress the buffer spring 82, thereby consuming the energy of water flow through the elastic buffer assembly 8 to avoid the phenomenon of water hammer.

In the first embodiment of the present invention, the water control seat 7 has a water-passing orifice 708 passing through two sides of the water control seat 7. The inner wall of the water-passing orifice 708 is formed with the mixed water outlet 705 and a sensor controlled outlet 709 to communicate with the outlet 201 of the manual valve core 2 and the outlet end of the second outlet water channel 702, respectively. The opening at one end of the water-passing orifice 708 communicates with the main outlet water channel 10, and the opening at the other end of the water-passing orifice 708 is closed by a water control seat plug 713. The water control seat plug 713 has a plug channel 7131 therein. The side wall of the water control seat plug 713 is formed with a perforation 7132 communicating with the plug channel 7131 and the mixed water outlet 705. A water-passing pipe 714 connected to the water control seat plug 713 is fitted in the water-passing orifice 708. One end of the water-passing pipe 714 is inserted into the plug channel 7131. The first outlet water channel 701 is formed in the water-passing pipe 714. The inlet end of the first inlet water channel 701 communicates with the plug channel 7131. The outlet end of the first outlet water channel 701 communicates with the main outlet water channel 10. The water-passing channel 706 is formed between the outer wall of the water-passing pipe 714 and the inner wall of the water-passing orifice 708. The water-passing channel 706 communicates with the sensor controlled outlet 709. The outside of the water control seat 7 may be provided with a connecting joint 715. The connecting joint 715 communicates with the water-passing orifice 708, so that the water-passing channel 706 and the first outlet water channel 701 communicate with the connecting joint 715, and the connecting joint 715 communicates with the first outlet water channel 701 and the second outlet water channel 702. One end of the main outlet pipe 13 is connected to the connecting joint 715 so that the main outlet water channel 10 communicates with the first outlet water channel 701 and the second outlet water channel 702. An aerator 131 may be connected to the other end of the main outlet water channel 10, creating a non-splashing stream and delivering a mixture of water and air.

In the first embodiment of the present invention, the water flow sensor 4 includes a rotatable magnetic impeller 41 located in the first outlet water channel 701 and a Hall element 42 located outside the first outlet water channel 701. The Hall element 42 is electrically connected to the controller 6. When water passes through the first outlet water channel 701, the magnetic impeller 41 rotates so that the Hall element 42 generates a signal and outputs it to the controller 6 accordingly.

In the first embodiment of the present invention, the multi-control automatic faucet of the present invention further includes an auxiliary sensor switch 5'. The auxiliary sensor switch 5' is installed on the faucet body 1. The auxiliary sensor switch 5' is electrically connected to the controller 6. The auxiliary sensor switch 5' is configured to sense the manual operation so as to control the action of the solenoid valve core 3. The auxiliary sensor switch 5' is disposed on the side of the spout 12. The main sensor switch 5 is disposed at the outlet of the spout 12. The solenoid valve core 3 controls whether water flows through the second outlet water channel 702 according to the signals of the main sensor switch 5 and the auxiliary sensor switch 5'. In this way, in the sensor control mode of the present invention, the working state of the auxiliary sensor switch 5' may be as described below. Each time the auxiliary sensor switch 5' senses a manual operation, the controller 6 controls the solenoid valve core 3 to switch the opening and closing of the second outlet water channel 702. Thus, the faucet can spray water continuously under the sensor control mode, which is convenient for the user to use. When the auxiliary sensor switch 5' is used to control the solenoid valve core 3 and when the water flow sensor 4 detects that there is water flowing through the first outlet water channel 701, the controller 6 controls the auxiliary sensor switch 5' to be inactive while the controller 6 controls the solenoid valve core 3 to be switched off and the main sensor switch 5 to be inactive, so that the multi-control automatic faucet of the present invention is completely in the manual control mode.

It should be noted that the working state of the auxiliary sensor switch 5' may be as described below. Each time the auxiliary sensor switch 5' senses a manual operation, the controller 6 controls the main sensor switch 5 to be switched on and off. In this way, when the main sensor switch 5 is not required to sense the manual operation, the main sensor switch 5 can be switched off to avoid wrong operations. In addition, the multi-control automatic faucet of the present invention may sense the distance of the user through the main sensor switch 5 or the auxiliary sensor switch 5', so as to realize different spray functions.

Second Embodiment

As shown in FIGS. 9 to 15, in the second embodiment of the present invention, the faucet body 1 may include a hollow main body 11 and a spout 12 disposed on one side of the main body 11. The manual valve core 2, the water control seat 7 and the solenoid valve core 3 are sequentially arranged in the main body 11 in an upper-to-lower direction, so that the manual valve core 2 and the solenoid valve core 3 are located on the upper and lower ends of the water control seat 7, respectively. This is beneficial to reduce the inner diameter of the faucet body 1. The main outlet water channel 10 is disposed in the spout 12. Specifically, the inner cavity of the spout 12 forms the main outlet water channel 10. An upper sealing ring a and a lower sealing ring b are fitted between the outer wall of the water control seat 7 and the inner wall of the main body 11. An annular water chamber S is formed among the water control seat 7, the main body 11, the upper sealing ring a and the lower sealing ring b. The main outlet water channel 10 communicates with the first outlet water channel 701 and the second outlet water channel 702 through the annular water chamber S. The inner wall of the main body 11 has a retaining edge 111 to abut against the bottom of the water control seat 7 to prevent the water control seat 7 from falling. The solenoid valve core 3 is locked to the water control seat 7 through screws. The water control seat 7 may be provided with a sleeve 711 with an opening facing upward. The sleeve 711 is arranged on the connecting seat 71. The manual valve core 2 is inserted into the sleeve 711. The sleeve 711 is connected with a press cover 712 that presses the manual valve core 2 to prevent the manual valve core 2 from coming out.

In the second embodiment of the present invention, the manual valve core 2 may be a single-handle dual-control mixed water valve core 20. The single-handle dual-control mixed water valve core 20 can adjust water temperature and water flow. The lever of the single-handle dual-control mixed water valve core 20 is connected to a handle 21 for the user to operate. The water control seat 7 includes a first inlet water channel 703 and a second inlet water channel 704 each having upper and lower openings. The first inlet water channel 703 and the second inlet water channel 704 pass through the upper and lower ends of the water control seat 7. The single-handle dual-control mixed water valve core 20 has a first inlet 202 and a second inlet 203 to communicate with the upper openings of the first inlet water channel 703 and the second inlet water channel 704, respectively. In this way, water flows into the single-handle dual-control mixed water valve core 20 from the first inlet water channel 703 and the second inlet water channel 704. Hot water and cold water are introduced into the first inlet water channel 703 and the second inlet water channel 704, respectively. The water control seat 7 further has a mixed water outlet 705 communicating with the first outlet water channel 701. The mixed water outlet 705 has an opening facing upwards. The outlet 201 of the single-handle dual-control mixed water valve core 20 is in communication with the mixed water outlet 705. In this way, the water flow of the single-handle dual-control mixed water valve core 20 is delivered to the first outlet water channel 701 through the mixed water outlet 705.

In the second embodiment of the present invention, the second outlet water channel 702 of the water control seat 7 may include a water chamber 7021 and a sensor controlled water channel 7022. The water chamber 7021 communicates with the sensor controlled water channel 7022 through a water-passing opening 7023. The outlet end of the sensor controlled water channel 7022 is the outlet end of the second outlet water channel 702. The outlet end of the second outlet water channel 702 is disposed on the side of the water control seat 7 and communicates with the annular water chamber S. A valve head 31 of the solenoid valve core 3 is inserted into the water chamber 7021 and movably blocks the water-passing opening 7023, thereby controlling whether water flows through the second outer water channel 702. The bottom of the water chamber 7021 may be provided with a mounting opening 7024. The valve head 31 of the solenoid valve core 3 extends into the water chamber 7021 from the mounting opening 7024. In this way, the solenoid valve core 3 is disposed under the water control seat 7. An outlet check valve 73 is provided in the sensor controlled water channel 7022. The outlet check valve 73 can prevent the water flow output from the first outer water channel 701 from flowing back to the water chamber 7021.

In the second embodiment of the present invention, the water control seat 7 further has an inlet water passage 707 communicating with the water chamber 7021 and the second inlet water channel 704. In this way, water is introduced into the water chamber 7021 from the second inlet water channel 704. It should be noted that, in the present invention, the inlet water passage 707 may communicate with the water chamber 7021 and the first inlet water channel 703. In this way, water is introduced into the water chamber 7021 from the first inlet water channel 703.

In the second embodiment of the present invention, the water control seat 7 has a water-passing orifice 708 communicating with the outlet 201 of the manual valve core 2 and the annular water chamber S. A water-passing pipe 714 is fitted in the water-passing orifice 708. The first outlet water channel 701 is formed in the water-passing pipe 714. The inlet end of the first outlet water channel 701 communicates with the outlet 201 of the manual valve core 2. The outlet end of the first outer water channel 701 communicates with the main outlet water channel 10 through the annular water chamber S.

In the second embodiment of the present invention, the water flow sensor 4 includes a rotatable magnetic impeller 41 located in the first outlet water channel 701 and a Hall element 42 located outside the first outlet water channel 701. The Hall element 42 is electrically connected to the controller 6. When water passes through the first outlet water channel 701, the magnetic impeller 41 rotates so that the Hall element 42 generates a signal and outputs it to the controller 6 accordingly. The water control seat 7 may have a mounting groove 700. The Hall element 42 is fitted in the mounting groove 700, which is beneficial to reduce the volume of the multi-control automatic faucet of the present invention.

In the second embodiment of the present invention, the multi-control automatic faucet of the present invention further comprises a power supply battery 9 electrically connected to the controller 6. The power supply battery 9 is installed to a battery holder 91. The battery holder 91 includes an elastic clamp 911. The elastic clamp 911 is configured to clamp one of a first water supply pipe and a second water supply pipe, so that the power supply battery 9 is retained on one of the first water supply pipe and the second water supply pipe with ease. The battery holder 91 may be formed with a slot 912 for insertion of a screwdriver L, such that the user can repair the multi-control automatic faucet of the present invention.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A multi-control automatic faucet, comprising a faucet body, a manual valve core, a solenoid valve core, a water flow sensor, a main sensor switch, and a controller;

the faucet body including a main outlet water channel and a water control seat therein, the water control seat having a first outlet water channel and a second outlet water channel to communicate with the main outlet water channel;

the manual valve core being installed to the faucet body, the manual valve core having an outlet communicating with the first outlet water channel;

the solenoid valve core being installed in the faucet body, the solenoid valve core being configured to open and close the second outlet water channel;

the water flow sensor being installed in the faucet body, the water flow sensor being configured to detect whether water flows through the first outlet water channel;

the main sensor switch being installed to the faucet body, the main sensor switch being configured to sense a manual operation to control an action of the solenoid valve core;

the controller being electrically connected to the solenoid valve core, the water flow sensor and the main sensor switch;

wherein when the water flow sensor detects that there is no water flowing through the first outlet water channel, the controller controls the solenoid valve core to open the second outlet water channel according to a signal of the main sensor switch; when the water flow sensor detects that there is water flowing through the first outlet water channel, the controller controls the main sensor switch to be inactive and the solenoid valve core to close the second outlet water channel; wherein the manual valve core is a single-handle dual-control mixed water valve core, the single-handle dual-control mixed water valve core is located at an upper end of the water control seat;

the water control seat includes a first inlet water channel and a second inlet water channel each having upper and lower openings, the single-handle dual-control mixed water valve core has a first inlet and a second inlet to communicate with the upper openings of the first inlet water channel and the second inlet water channel, respectively; the water control seat further has a mixed water outlet communicating with the first outlet water channel, the mixed water outlet has an opening facing upwards, and the outlet of the single-handle dual-control mixed water valve core is in communication with the mixed water outlet;

wherein the second outlet water channel of the water control seat includes a water chamber and a sensor controlled water channel, the water chamber communicates with the sensor controlled water channel through a water-passing opening;

a valve head of the solenoid valve core is inserted into the water chamber and movably blocks the water-passing opening; and wherein the water control seat further has a first inlet water passage communicating with the water chamber and the first inlet water channel and a second inlet water passage communicating with the water chamber and the second inlet water channel.

2. The multi-control automatic faucet as claimed in claim 1, wherein a side wall of the water control seat is formed with a first mounting hole, the first inlet water passage is in communication with the first inlet water channel through the first mounting hole; a first blocking member is rotatably fitted in the first mounting hole, an inner end of the first blocking member is provided with a flow regulating portion, the flow regulating portion is configured to control water flow passing through the first mounting hole along with rotation of the first blocking member, and the faucet body has an operating hole corresponding to the first mounting hole.

3. The multi-control automatic faucet as claimed in claim 1, wherein a side wall of the water control seat is formed with a first mounting hole and a second mounting hole;

the first inlet water passage is in communication with the first inlet water channel through the first mounting hole; an opening at an outer end of the first mounting hole is closed by a first blocking member, an inner side wall of the first mounting hole is formed with a first water hole communicating with the first inlet water channel, an inner end face of the first mounting hole is formed with a first orifice communicating with the first inlet water passage, a first inlet check valve is provided in the first orifice;

the second inlet water passage is in communication with the second inlet water channel through the second mounting hole; an opening at an outer end of the second mounting hole is closed by a second blocking member, an inner side wall of the second mounting hole is formed with a second water hole communicating with the second inlet water channel, an inner end face of the second mounting hole is formed with a second orifice communicating with the second inlet water passage, and a second inlet check valve is provided in the second orifice.

4. The multi-control automatic faucet as claimed in claim 1, wherein the first inlet water channel and the second inlet water channel are provided with a first filter and a second filter, respectively; the first filter covers a junction of the first inlet water channel and the first inlet water passage, and the second filter covers a junction of the second inlet water channel and the second inlet water passage.

5. The multi-control automatic faucet as claimed in claim 1, wherein the water control seat has a water-passing orifice passing through two sides of the water control seat, an inner wall of the water-passing orifice is formed with a mixed water outlet and a sensor controlled outlet to communicate with the outlet of the manual valve core and an outlet end of the second outlet water channel respectively, an opening at one end of the water-passing orifice communicates with the main outlet water channel, and an opening at another end of the water-passing orifice is closed by a water control seat plug;

the water control seat plug has a plug channel therein, a side wall of the water control seat plug is formed with a perforation communicating with the plug channel and the mixed water outlet, a water-passing pipe connected to the water control seat plug is fitted in the water-passing orifice, the first outlet water channel is formed in the water-passing pipe, an inlet end of the first inlet water channel communicates with the plug channel, an outlet end of the first outlet water channel communicates with the main outlet water channel; the water-passing channel is formed between an outer wall of the water-passing pipe and the inner wall of the water-passing orifice, and the water-passing channel communicates with the sensor controlled outlet and the main outlet water channel.

* * * * *